United States Patent [19]

Tompkins et al.

[11] Patent Number: 5,664,490

[45] Date of Patent: Sep. 9, 1997

[54] MELON PEELER APPARATUS

[75] Inventors: Nicholas J. Tompkins; Tim T. Murphy, both of Arroyo Grande; Andrew T. Furukawa, Santa Maria, all of Calif.

[73] Assignee: Fresh King LLC, Santa Maria, Calif.

[21] Appl. No.: 743,226

[22] Filed: Nov. 5, 1996

[51] Int. Cl.⁶ .............. A23N 1/02; A23N 4/20; A23N 7/08
[52] U.S. Cl. .............. 99/541; 99/589; 99/590; 99/547; 99/584
[58] Field of Search .......... 99/537–541, 588–594, 99/542–545, 547, 564, 584, 487, 638; 426/481–485; 83/451, 404.3, 856, 870; 30/124, 114, 315, 280

[56] References Cited

U.S. PATENT DOCUMENTS

| | | | |
|---|---|---|---|
| 3,596,354 | 8/1971 | Emerson | 83/451 |
| 4,175,690 | 11/1979 | Bova et al. | 99/537 X |
| 4,310,680 | 1/1982 | Cruz et al. | 83/870 |
| 4,318,339 | 3/1982 | Sage | 99/589 |
| 4,571,832 | 2/1986 | Hendy et al. | 30/280 |
| 4,763,414 | 8/1988 | NcNeill, II | 99/638 X |
| 4,779,504 | 10/1988 | Murphy et al. | 83/856 |
| 5,044,268 | 9/1991 | Lin | 99/541 |
| 5,148,738 | 9/1992 | Orman et al. | 99/487 |
| 5,199,350 | 4/1993 | Lin | 99/584 X |
| 5,313,707 | 5/1994 | Tarafdar | 30/315 |
| 5,373,781 | 12/1994 | Knasel | 99/542 |
| 5,463,943 | 11/1995 | Knasel | 99/544 X |

*Primary Examiner*—Timothy F. Simone
*Attorney, Agent, or Firm*—Lynn & Lynn

[57] ABSTRACT

A melon peeler simultaneously removes the seed pod, seeds and rind from a melon slice. A melon slice input channel and a drive assembly cooperate to guide a melon slice toward a cutting assembly arranged across the input channel. The cutting assembly includes an upper blade and a lower blade arranged so that the upper blade removes the seeds and seed pod while the lower blade removes the find, leaving a melon slice of selected thickness.

7 Claims, 6 Drawing Sheets

MELON PEELER APPARATUS

BACKGROUND OF THE INVENTION

This invention relates generally to processing food products such as melons. This invention relates particularly to apparatus and method for removing the seeds, seed pod and rind from a melon slice.

Previous melon peelers remove only the finds of melons such as cantaloupes and honey dews. The seeds and seed pocket are typically removed manually or in a mechanical process separate from removal of the find. This double handling of melon products is inefficient and expensive.

SUMMARY OF THE INVENTION

The present invention provides a melon peeler apparatus that simultaneously removes the find, seeds and seed pocket from a melon slice, leaving a smoothly cut, uniform melon slice that is readily formed into melon cubes.

A melon peeler apparatus according to the present invention comprises a frame and a melon slice input section connected to the frame. The melon slice input section includes a melon slice input channel arranged for receiving a melon slice that includes a find, seed pod and seeds. A peeling assembly is arranged across the input channel for simultaneously cutting the seeds, seed pod and rind from the melon slice. A drive assembly is mounted to the housing, the drive assembly including apparatus for propelling the melon slice through the peeling assembly.

The melon peeling assembly preferably comprises first cutting means arranged for cuffing the rind from the melon slice and second cutting means arranged for cutting the seeds and seed pod from the melon slice. The first cutting means comprises a first blade arranged across the channel and spaced apart from the bottom of the channel a distance selected for removing the rind from the melon slice. The second cutting means comprises a second blade arranged across the channel and spaced apart from the first blade a distance selected for removing the seeds and seed pod and leaving a finished melon slice of a selected thickness.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
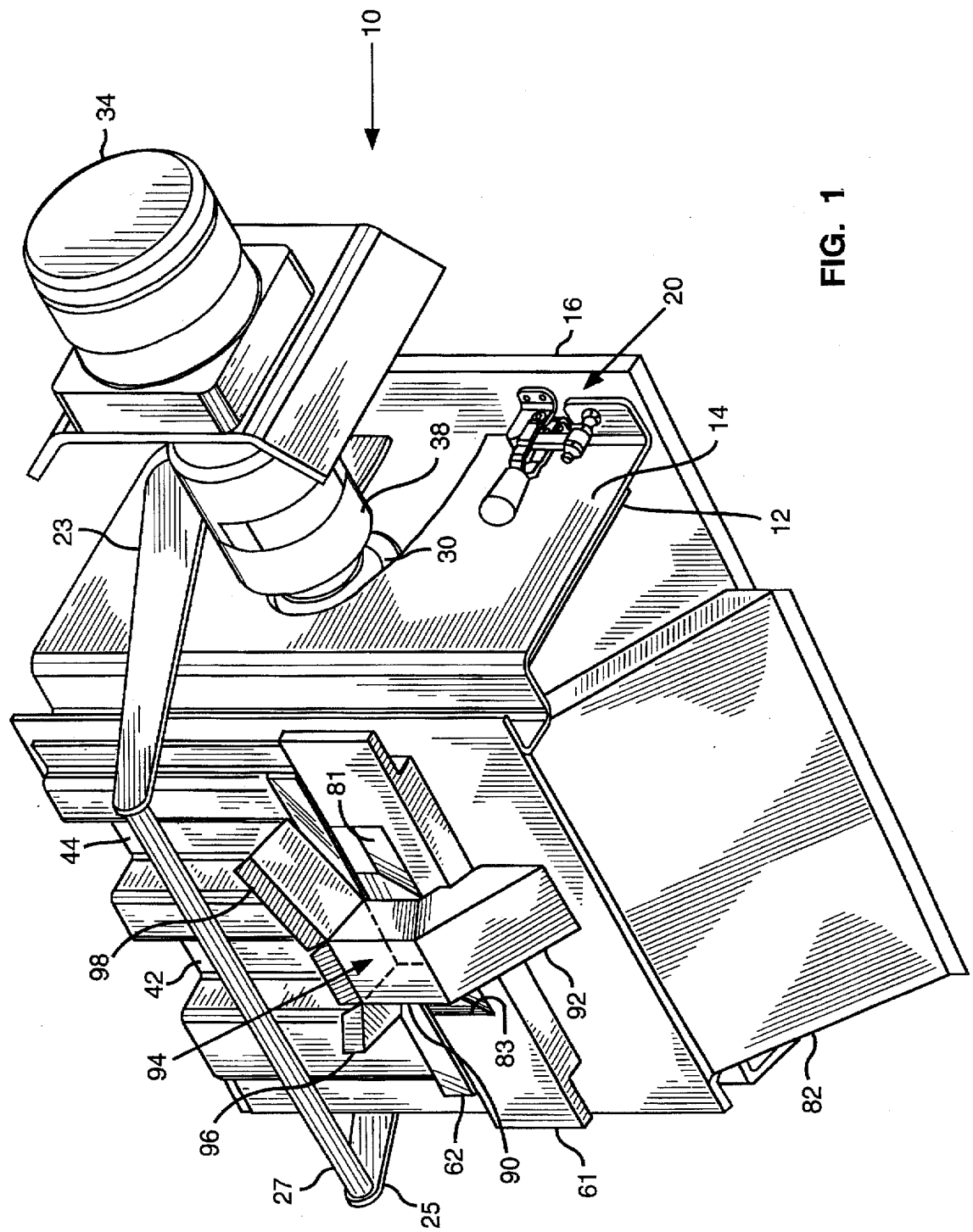
FIG. 1 is a perspective view of a melon peeler machine according to the present invention showing a housing, a top cover, a melon slice input section, and a waste removal chute.

Referring to FIGS. 1–4, a melon peeler apparatus 10 according to the present invention includes a frame 12, and a top cover 14. The frame 12 and top cover 14 may be attached to a base 16. The frame 12 and top cover 14 enclose portions of a drive mechanism 18, best shown in FIG. 4, that drives melon slices through the melon peeler machine 10 for removal of the rinds and seed pods. The melon peeler machine 10 is configured for simultaneous removal of the rind and seed pod from melon slices.

Figure 2:
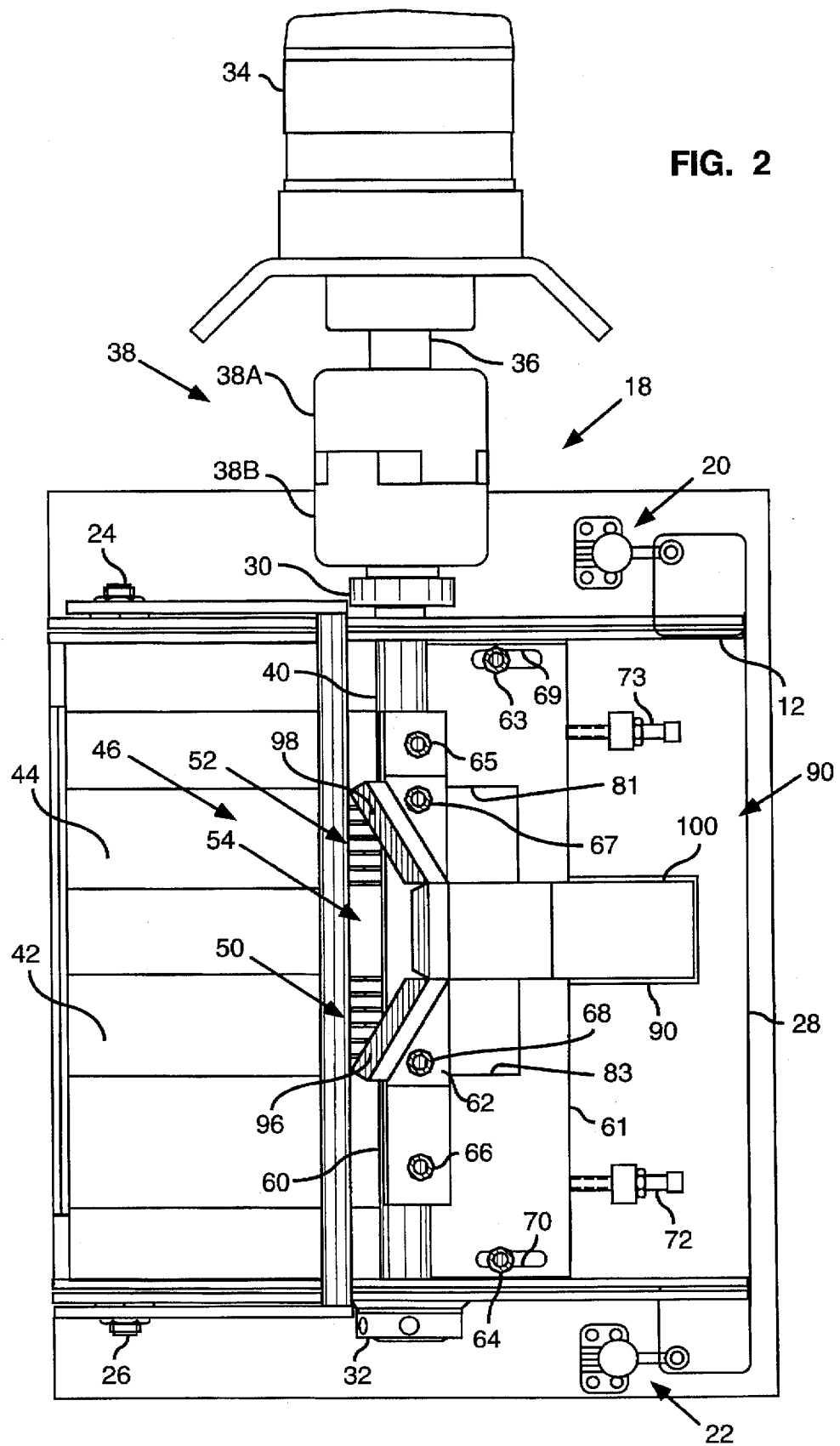
FIG. 2 is a front elevation view of the melon peeler apparatus of FIG. 1.
Figure 4:
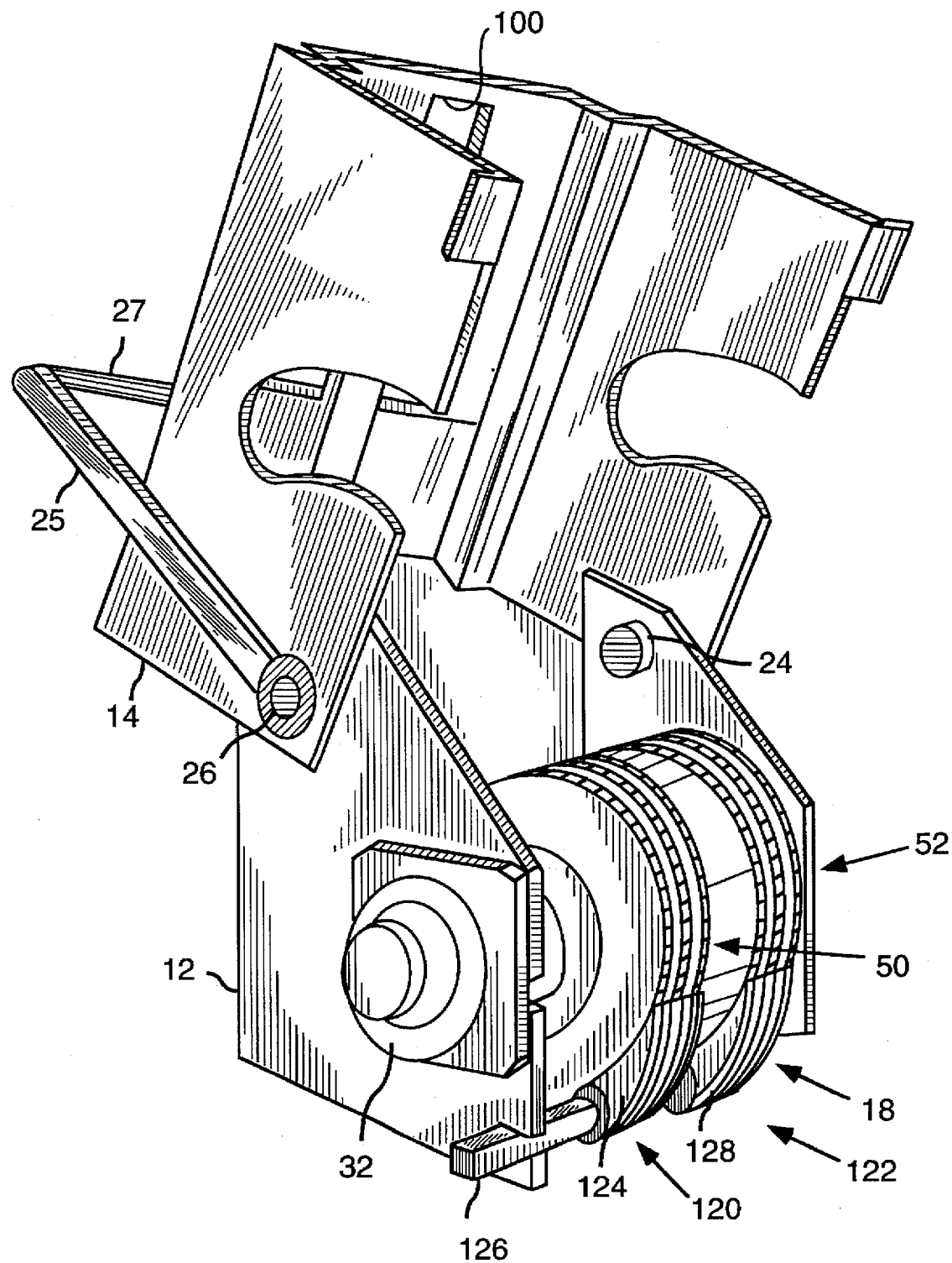
FIG. 4 is a perspective view of the melon peeler machine of FIG. 1 with the top cover raised to reveal additional features of the apparatus for feeding melon slices through the melon peeler machine.

As shown in FIGS. 1 and 2, the top cover 14 is secured to the frame 12 in normal operation. Releasable fasteners 20 and 22 retain the top cover 14 in position secured to the frame 12 during normal operation of the melon peeler machine 10. Referring to FIGS. 2 and 4, the top cover 14 is rotatably mounted to the frame at pivot points 24 and 26. When the fasteners 20 and 22 are released, the lower portion 28 of the top cover 14 may be rotated away from the frame 14 to expose the drive mechanism 18 for cleaning and maintenance. A pair of arms 23 and 25 extend from the pivot points 24 and 26. A bar 27 extends between the arms 23 and 25 and extends across the top plate 14. The bar 27 may be used to rotate the arms 23 and 25 so that they act as safety levers to stop rotation of the drive assembly 18.

Referring to FIGS. 2 and 4, the drive mechanism 18 is mounted to the frame 12 by a pair of brackets 30 and 32. The drive mechanism 18 also includes a motor 34 that provides power to a motor shaft 36. The motor shaft 36 is connected to an input side of a coupling 38, which is formed to have coupling halves 38A and 38B. The coupling half 38B is connected to a shaft 40 that extends between the brackets 30 and 32. The coupling halves 38A and 38B are separable so that the motor 34 may be disengaged from the shaft 40. The motor 34 is preferably hydraulically powered, although motors powered by other means would be acceptable.

The top cover 14 includes a pair of channels 42 and 44 that are configured for receiving melon slices that are to be input into a peeling assembly 46. The melon peeler machine 10 is ordinarily oriented with the channels 42 and 44 essentially vertically aligned so that the influence of gravity aids in moving a melon slice into engagement with the drive mechanism 18.

Referring to FIGS. 2 and 4–6, the drive mechanism 18 includes a pair of rotary blade assemblies 50 and 52 that are mounted to the shaft 40. Each of the blade assemblies 50 and 52 includes a plurality of toothed circular blades 50A and 52A, respectively, that are similar to conventional circular saw blades. The structures of the blades are discussed in detail subsequently with reference to FIGS. 7–9.

As shown in FIGS. 1, 2, 5 and 6, the peeling assembly 46 is arranged for removing the seed pod and rind from a melon slice. The peeling assembly 46 preferably includes a lower cutting apparatus 60 and an upper cutting apparatus 62. The lower cutting apparatus 60 may be mounted directly to the top cover 14, or it may be mounted to a plate 61 that is connected to the top cover 14 by fasteners 63 and 64. The lower cutting apparatus may be attached to the plate 61 by fasteners 65 and 66. The lower cutting apparatus is arranged to lie across the channels 42 and 44. The lower cutting apparatus 60 may be a knife blade, a wire or other suitable device for cutting melons. The lower cutting apparatus 60 preferably is perpendicular to the longitudinal axes of the channels 42 and 44.

The lower cutting apparatus 60 is arranged to be spaced apart by a small vertical distance from the bottom surfaces of the channels 42 and 44. The spacing between the lower cutting apparatus 60 and the channel bottoms is selected to be slightly greater than the thickness of a melon rind, which is typically about 0.25". The spacing between the lower cutting apparatus 60 and the channel bottoms preferably may be adjusted by manipulating the fasteners 65 and 66 that connect the lower cutting apparatus 60 to the plate 61.

The upper cutting apparatus 62 is arranged to remove the seeds and seed pod from a melon slice while the rind is being removed. The upper cutting apparatus 62 may be mounted to the plate 61 by fasteners 65 and 66. The upper cutting apparatus 62 is arranged to be generally above the lower cutting apparatus and mounted to the plate 61 across the channels 42 and 44. The lower cutting apparatus 60 and the upper cutting apparatus 62 are vertically spaced apart by a distance selected to be the thickness of the melon slice after it has passed through the melon peeler apparatus 10. The upper cutting apparatus 62 is spaced apart vertically from the channel bottoms by a distance that provides removal of the seeds and seed pod without removing an excessive amount of the meat of the melon slice. Typically the vertical spacing between the lower cutting apparatus 60 and the upper cutting apparatus 62 may be about 0.75 to 1.0 inch. The height of the upper cutting apparatus 62 above the lower cutting apparatus 60 preferably is adjustable by manipulating the fasteners 67 and 68 that connect the upper cutting apparatus 62 to the plate 61.

The position of the plate 61 on the top plate 14 may also be adjusted. The fasteners 63 and 64 preferably extend through elongate slots 69 and 70 in the plate 61. The fasteners 63 and 64 may be loosened to allow the plate 61 to be moved up or down on the top plate 14. The various adjustments allow the melon peeler machine 10 to be arranged to process melon slices of varying size and rind thickness.

The channels 42 and 44 are arranged to receive melon sections that include the finds, seed and seed pod. Referring to FIGS. 2, 3, 5 and 6, the top plate 14 includes an opening 54. The rotary blade assemblies 50A and 50B are arranged so that their edges extend a short distance into the opening 54 to engage the finds of melon slices input via the channels 42 and 44.

Before being placed in the input channels 42, 44 the melons have been cut into sections. Each section may be any suitable portion of the whole melon. For example, the melons may be cut into four or eight separate slices. The melon sections are inserted into the channels 42 and 44 with the seeds seed pod facing upward. The melon slice 77 is placed over the opening 54 so that the toothed edges of the rotary blade assembly corresponding to the channel in which the melon slice is placed engages the rind and moves the melon slice 77 toward the cutting assembly 46.

Figure 5:
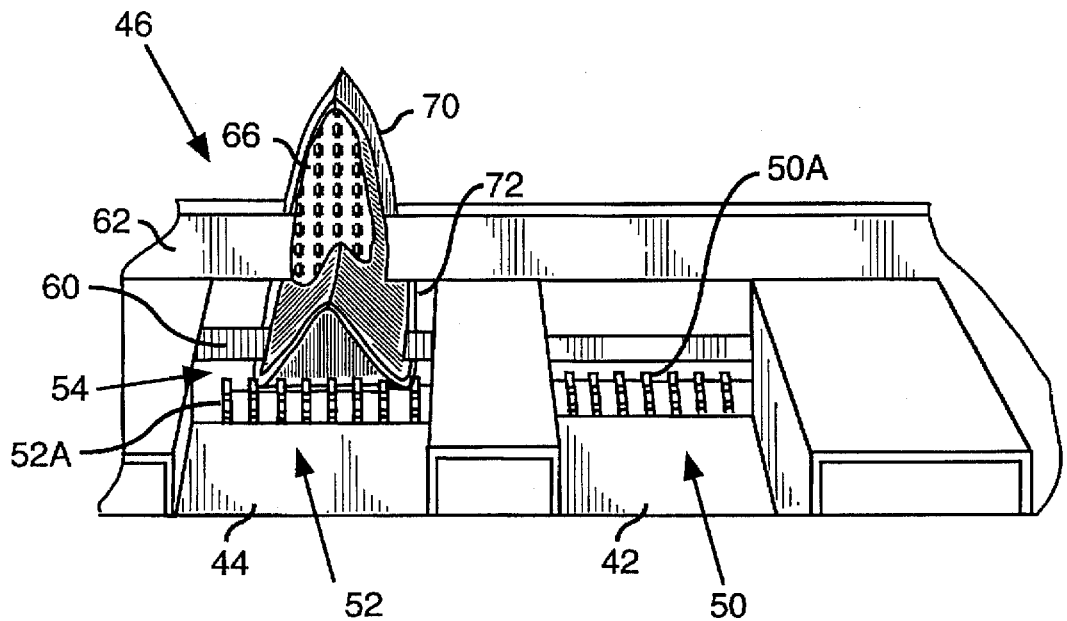
FIG. 5 is a partial perspective view of the invention showing a melon slice being fed through the melon peeler machine.
Figure 6:
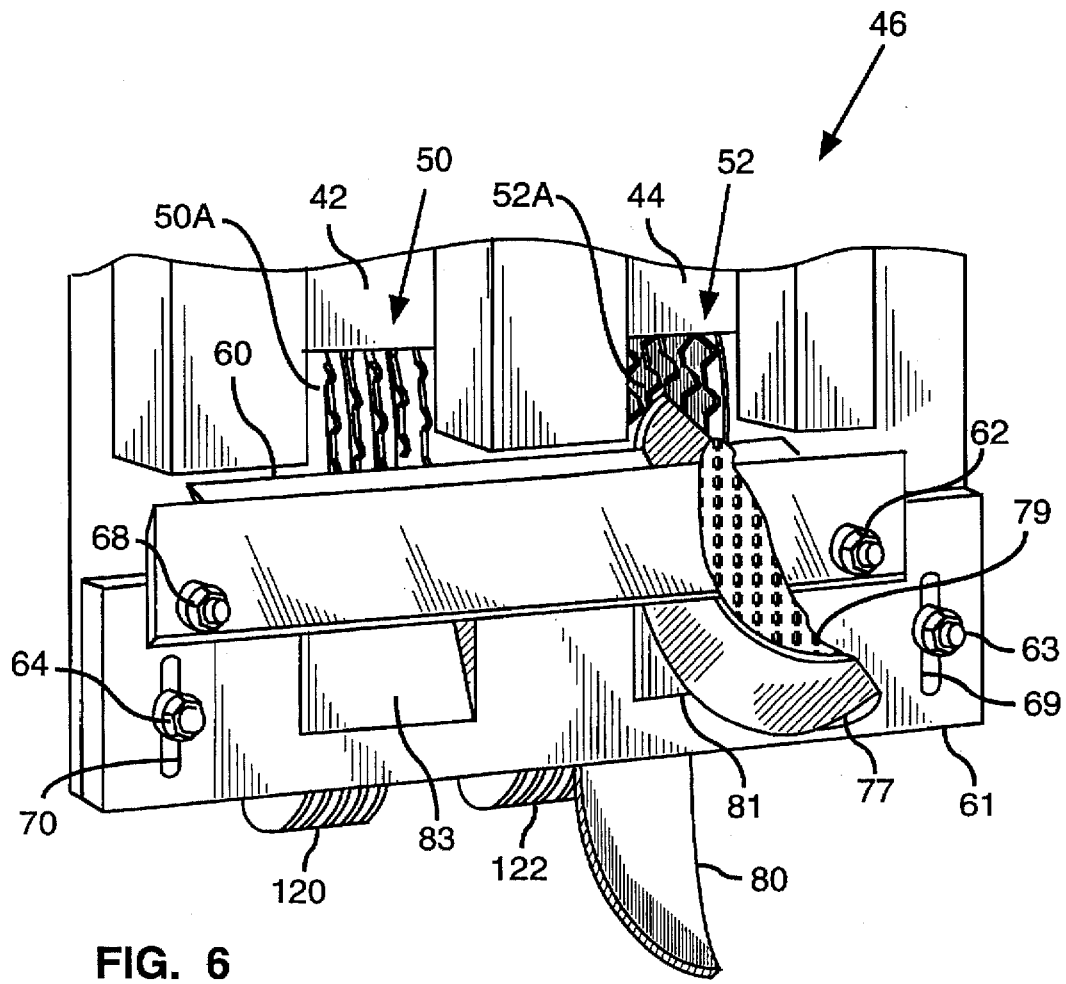
FIG. 6 is a partial top plan view of the invention showing a melon slice being fed through the melon peeler machine.

The drive mechanism 18 rotates the rotary blade 50A and 52A assemblies such that the toothed blades engage the finds of melon slices input from the channels 42 and 44, respectively, and drive them toward the blades 60 and 62. As shown in FIGS. 5 and 6, the upper peeling blade 62 removes the seed pod 79 from a melon slice 77 input via the channel 44 while the lower cutting blade 60 removes the rind 80.

The channels 42 and 44 may be identical, or they may be formed to have different depths and widths to allow for variations in the size of melon slices that may be processed with the melon peeler machine 10. The rotary blade assemblies 50A and 52A may be identical. However, the tooth configurations of the rotary blade assemblies 50A and 52A preferably are different. The tooth configurations are designed to engage the rinds of melons such as cantaloupes and honeydews. Honeydew melons require larger teeth in the rotary blades than are required for cantaloupes.

FIG. 6 shows the melon slice 77 just before the rind 80 and seed pod 79 are completely removed. The rind 80 is ejected from the cutting assembly behind the lower peeling blade 62. The rind 80 then falls onto a plate 82. The plate 82 is preferably inclined at an angle such that the rind 80 slides downward to a conveyor (not shown) for disposal. The peeled melon slice emerges from the cutting assembly through a discharge opening 81 that is in vertical alignment with the input channel 44. A similar discharge opening 83 is in vertical alignment with the input channel 42. The peeled melon slices are inspected and then placed on a conveyor (not shown) for further processing.

Figure 3:
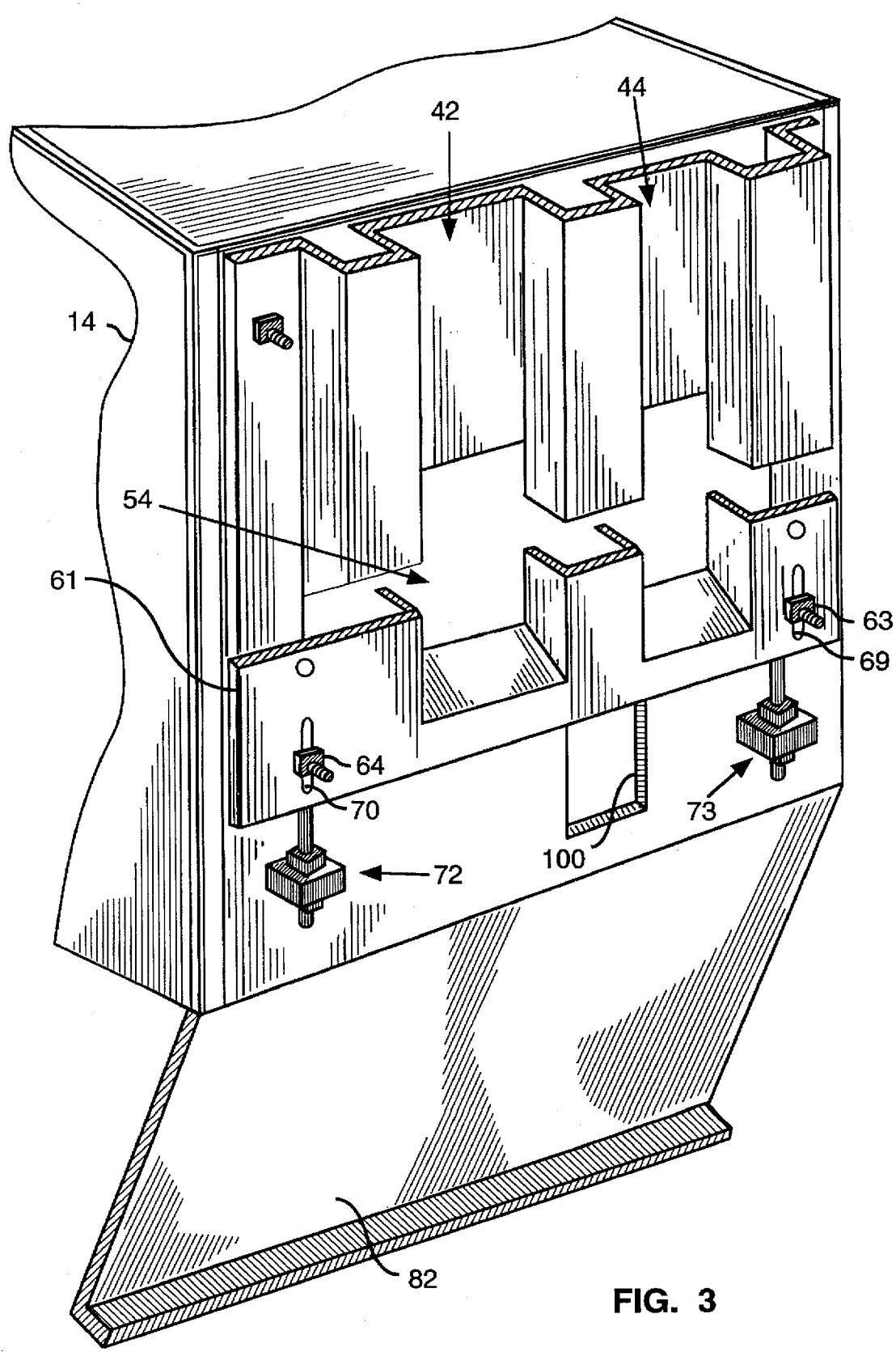
FIG. 3 is a perspective view of a portion of the melon peeler machine of FIG. 1.

The seed pod 79 is ejected from the cutting assembly above the upper peeling blade 60. Referring to FIGS. 1–3 the melon peeler apparatus 10 may include a waste collection apparatus 90 for collecting the seed pod 79 and rind 80 after their removal from the melon slice 77. The waste collection apparatus 90 includes a waste conduit 92 that is arranged to be between the channels 42 and 44. An input opening 94 in the conduit is arranged to receive the seeds and seed pod after they have been removed from the melon slice. A pair of collection arms 96 and 98 extend from the waste conduit 92. The collection arms preferably make angles of about 30° with their respective channels 42 and 44. Material removed from the melon slice is collected by the collection arms and directed into the opening 94. The conduit 92 then carries the removed seed pod material to an opening 100 in the top cover 14. The seed pod 79 then passes through the opening 100 and then falls to the plate 82, which guides the removed rind 80 and seed pod 79 to the conveyor for disposal.

Figure 7:
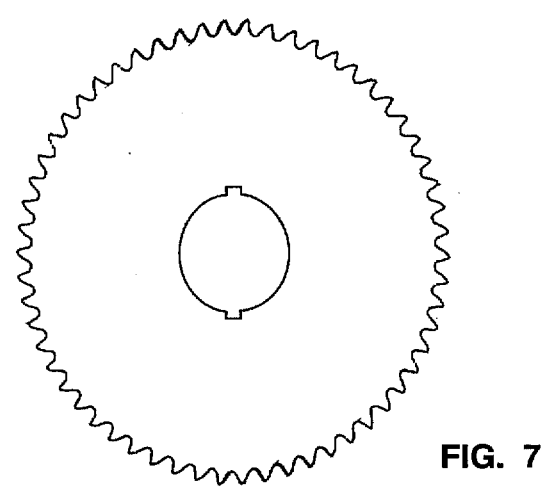
FIG. 7 illustrates a circular toothed blade that may be included in the melon peeler machine according to the present invention to feed melon slices therethrough.
Figure 8:
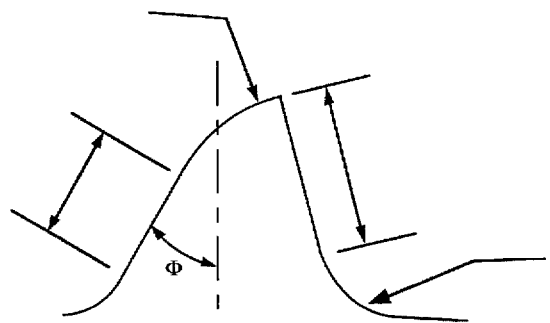
FIG. 8 illustrates a first tooth structure that may be included on the circular blade of FIG. 7.
Figure 9:
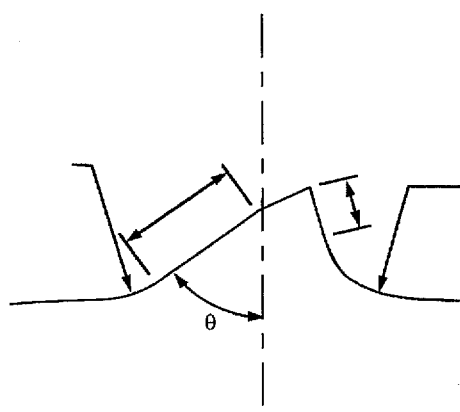
FIG. 9 illustrates a second tooth structure that may be included on the circular blade of FIG. 7.

FIG. 4 illustrates additional features of the drive mechanism. The blade assemblies 50 and 52 are each shown to include a plurality of cutting blades. When the top cover 14 is closed, the blade assemblies 50 and 52 extend into the opening 54 in alignment with the channels 42 and 44, respectively. After the rind 80 is removed, some of the rind material may stick to the teeth of the blades. In FIG. 4 the teeth are shown schematically. FIGS. 7–9 show the teeth in detail. The blade assemblies 50 and 52 therefore includes stripper assemblies 120 add 122, respectively. The stripper assembly 120 may be formed as an array of plates 124 mounted to a rod 126 that is mounted between the sides of the frame 12. The plates are spaced apart by a distance that is slightly larger than the thickness of the individual rotary blades to form an array of slots 128. As the blades rotate away from the lower cutting apparatus 60, their edges extend into the slots 128. The small clearance between the sides of the blades and the plates 124 ships rind material away form the blade assemblies 50 and 52.

Referring to FIG. 7, a blade 150 that may be included in the blade assemblies 50 and 52 is shown. The blade 150 has a plurality of teeth 152 that preferably are spaced apart by 6°. FIG. 8 shows a first preferred tooth structure 154 for melon slices that require a relatively large tooth. The blade 150 preferably has a radius measured to the troughs of the teeth 152 of 3.75". The tooth height of the embodiment shown in FIG. 8 is about 0.25". FIG. 9 illustrates a tooth shape 156 that may be used when the rind requires a relatively small tooth. When the blade 150 has the smaller teeth 154, the blade radius from the center to the troughs of the teeth is 3.875". The height of the tooth 154 is about 0.125". The teeth are designed to engage the rind 80 and propel the melon slice through the peeling assembly 46 and then release the rind 80 so that the melon peeler machine does not become jammed.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A melon peeler apparatus, comprising:

a frame;

a melon slice input section connected to the housing, the melon slice input section including a melon slice input channel arranged for receiving therein a melon slice that includes a rind and a seed pod;

a peeling assembly arranged across the input channel; and a drive assembly mounted to the frame, the drive assembly including apparatus for propelling the melon slice toward the peeling assembly, the peeling assembly including cutting apparatus for simultaneously removing the rind and seed pod from the melon slice.

2. The melon peeler apparatus of claim 1, wherein the peeling assembly comprises:

first cutting means arranged for cutting the rind from the melon slice; and second cutting means arranged for cutting the seeds and seed pod from the melon slice.

3. The melon peeler apparatus of claim 2 wherein the first cutting means comprises a first blade arranged across the channel and spaced apart from the bottom of the channel a distance selected for removing the rind from the melon slice and wherein the second cutting means comprises a second blade arranged across the channel and spaced apart from the first blade a distance selected for removing the seeds and seed pod and leaving a finished melon slice of a selected thickness.

4. The melon peeler apparatus of claim 2 wherein the distance between the first cutting means from the surface of the channel is adjustable to accommodate finds of varying thickness and wherein the distance between the first and second cutting means is adjustable to accommodate melon slices of varying thickness.

5. The melon peeler apparatus of claim 1 wherein the drive assembly comprises:

a rotary blade assembly that includes a plurality of teeth angularly spaced on a cylindrical surface, the teeth being arranged to engage the rind of a melon slice input to the peeling assembly;

drive apparatus for rotating the rotary blade assembly; and stripper apparatus mounted to the frame adjacent the rotary blade assembly and arranged to remove material from the rotary blade assembly after it rotates away from the peeling assembly.

6. The melon peeler apparatus of claim 1, further including waste collection apparatus arranged to remove the rind and seed pod from the region of the peeling assembly after they have been cut from the melon slice.

7. The melon peeler apparatus of claim 6 wherein the waste collection apparatus includes:

an arm that extends across the input channel, the arm being arranged to collect the seed pod after it has been cut from the melon slice and direct the removed seed pod; and a chute arranged to receive the seed pod collected by the arm and direct the seed pod away from the peeling assembly for disposal.

* * * * *